(12) United States Patent
Isabelle (10) Patent No.: US 7,356,463 B1
(45) Date of Patent: Apr. 8, 2008

(54) SYSTEM AND METHOD FOR DETECTING AND DECODING SEMANTICALLY ENCODED NATURAL LANGUAGE MESSAGES

(75) Inventor: Pierre Isabelle, Biviers (FR)

(73) Assignee: Xerox Corporation, Norwalk, CT (US)

( * ) Notice: Subject to any disclaimer, the term of this patent is extended or adjusted under 35 U.S.C. 154(b) by 776 days.

(21) Appl. No.: 10/737,975

(22) Filed: Dec. 18, 2003

(51) Int. Cl.
*G06F 17/27* (2006.01)

(52) U.S. Cl. ......................................................... 704/9

(58) Field of Classification Search ...................... None
See application file for complete search history.

(56) References Cited

U.S. PATENT DOCUMENTS 5,659,771 A * 8/1997 Golding ....................... 715/533
5,799,269 A * 8/1998 Schabes et al. ................. 704/9
5,907,839 A * 5/1999 Roth .............................. 707/5

OTHER PUBLICATIONS

Mays et al, "Context Based Spelling Correction", Information Processing and Management, 27(5): 517-522, 1991.*
M. Chapman and G. Davida, "Hiding the Hidden: A Software System for Concealing Ciphertext as Innocuous Text", International Conference on Information and Communications Security, Beijing, P. R. China, Nov. 11-13, 1997.
"Cryptography FAQ", available on the Internet at http://www.faqs.org/faqs/cryptography-faq/, Aug. 17, 2003.
P. Davern and M. Scott, "Steganography: its history and its application to computer based data files", Working paper CA-0795, School of Computer Applications, Dublin City University, 1995.
N. F. Johnson, in "Steganalysis", Chapter 4 of Stefan Katzenbeisser (ed.), Fabien A. P. Petitcolas (ed.), "Information Hiding Techniques for Steganography and Digital Watermarking", Artech House Books, 2000.
N. F. Johnson, "Steganography", George Mason University, available on the internet at http://www.jjtc.com/stegdoc/steg1995.html, 1995.
N. F. Johnson and S. Jajodia, "Exploring Steganography: Seeing the Unseen", IEEE Computer, 31:2, pp. 26-34, 1998.
D. Khan, "The Codebreakers: the Story of Secret Writing", second edition, Scribner, New York, 1996.
National Foreign Language Center at the University of Maryland, Language and National Security, "Language in Intelligence", available on the Internet at http://www.nflc.org/security/lang_terror.htm, 2001.
R. Shuy, "Discourse Clues to Coded Language in an Impeachment Hearing", In G. Guy, C. Feagin, D. Schiffrin and J. Baugh (eds), "Towards a Social Science of Language: Papers in Honor of William Labov", Amsterdam: John Benjamins, pp. 121-138, 1997.

* cited by examiner

*Primary Examiner*—David Hudspeth
*Assistant Examiner*—Samuel G Neway
(74) *Attorney, Agent, or Firm*—Fay Sharpe LLP (57) ABSTRACT

A system detects and decodes semantic camouflage in natural language messages. The system is adapted to identify entities such as words or phrases in overt messages that are being used to disguise different and unrelated entities or concepts. The system automatically determines the semantic plausibility of the overt message and identifies entities that appear in implausible contexts. In addition, the system automatically estimates covert meanings for the entities identified in the overt message that appear in implausible contexts.

16 Claims, 4 Drawing Sheets

SYSTEM AND METHOD FOR DETECTING AND DECODING SEMANTICALLY ENCODED NATURAL LANGUAGE MESSAGES

BACKGROUND OF INVENTION

The present invention relates generally to a steganalytic method and apparatus for detecting and decoding semantically encoded natural language.

Generally, cryptography and stenography relate to the art of information hiding while cryptanalysis and steganalysis relate to the art of discovering how the information was hidden.

Cryptography, which includes encryption and decryption, involves scrambling a message using a key so that only those who have the key may descramble it. More specifically, encryption systems perform an encryption operation on a plaintext message using an encryption key to produce a ciphertext message that is not understandable but that is still visible. The receiver of a ciphertext message performs a corresponding decryption operation with a decryption system using a decryption key to recover the plaintext message. Cryptanalysis involves identifying the key. Additional background on cryptography is disclosed by Kahn, in "The Codebreakers: the Story of Secret Writing," second edition, Scribner, New York, 1996 (original ed.: MacMillan, 1967), which is incorporated herein by reference and referred to below as "The Codebreakers").

In contrast, steganography concerns techniques for hiding messages in such a way that their presence cannot be seen in the plaintext message. Thus, unlike cryptography which produces a visible message that cannot be understood without the appropriate key, steganography produces a visible message that can be understood but contains a hidden meaning within the visible message. Steganalysis is the art of detecting the steganographic meaning of the hidden message. Additional background on steganography and steganalysis is disclosed by Neil F. Johnson, in "Steganalysis", Chapter 4 of Stefan Katzenbeisser (ed.), Fabien A. P. Petitcolas (ed.), "Information Hiding Techniques for Steganography and Digital Watermarking", Artech House Books, 2000, which is incorporated herein by reference.

As defined herein, "semantic camouflage" refers to a subset of steganographic techniques, which subset includes those techniques used to hide a covert message in an overt message by performing a natural language transformation. The overt message is one that can be read on the face of the plaintext message. However, with additional information that describes the natural language transformation, the covert message may be uncovered. For example, a group of people may set up a convention for carrying out conversations between themselves where any reference to some illicit substance is to be made using a reference to "flowers". Their conversations could thereafter involve a discussion concerning the quality, age, variety, and quantity of the illicit substance without ever having to identify it as such in the conversation.

Others have described semantic camouflage. For example, Kahn in The Codebreakers describes "jargon code" that was used by spies during the $20^{th}$ century World Wars and the efforts of counter-intelligence services to intercept such coded messages through censorship activities. More specifically, Kahn in The Codebreakers at page 519 discloses that: "Censorship defends itself against this ruse by a feel for stilted or heavy-handed language and by a healthy skepticism concerning subject matter." Such interception of semantically camouflaged messages is based on a (manual) human assessment of whether the message is believable.

Yet others have described semantic camouflage as the field of "forensic linguistics", which is the study of linguistic evidence that can be brought to bear in legal contexts. One special case is the study of evidence indicating that the participants in some particular conversation might be making use of coded language with the intent to deceive. For example, Shuy in "Discourse Clues to Coded Language in an Impeachment Hearing" (published in G. Guy, C. Feagin, D. Schiffrin and J. Baugh, Eds., "Towards a Social Science of Language: Papers in Honor of William Labov", Amsterdam: John Benjamins, 1997, pp. 121-138), describes a report by an expert in forensic linguistics on a study conducted as part of a legal trial in order to assess whether a taped conversation showed any evidence of "partial and disguised codes".

Semantic camouflage is distinct from other steganographic techniques which involve concealing a ciphertext message as innocuous text. An example of such a system is disclosed by M. Chapman and G. Davida, in "Hiding the Hidden: A Software System for Concealing Ciphertext as Innocuous Text," International Conference on Information and Communications Security, Nov. 11-13, 1997, Beijing, P. R. China, in which an encrypted message is made to look like ordinary language using a number-to-word dictionary that turns visibly encrypted messages into something that looks like ordinary language, so as to escape notice from potential code-breakers.

Also, semantic camouflage is distinct from null ciphers which involve spreading parts of covert messages in discontinuous portions of overt or plaintext messages (e.g., where each part of a message may be spread at a character level, word level, or bit level). For example, a covert message may be spread over elements of a plaintext message using a cipher-key which states that every $n^{th}$ word of the plaintext message belongs to the covert message. While spreading words rather than characters may be easier for encoding and decoding, it has the drawback that potentially sensitive words of the covert message will appear overtly.

Semantic camouflage has certain advantages over other steganographic techniques such as null ciphers because of the simplicity in which it may be used to code and decode covert messages. Indeed, coding and decoding is easy enough that it can be used in real-time and thus in day-to-day conversations. Moreover, while coding and decoding rules of semantic camouflage will typically be agreed upon in advance, in some situations it is possible for the encoder to define simple camouflage rules without prior agreement, letting the recipient infer these rules from his knowledge of the situation (e.g., a bookie calls a long-time client and asks him if he wanted to play, the client may well infer that the word "play" is being used to mean "bet" even if that was not agreed upon in advance).

Thus, while semantic camouflage is related to steganographic techniques such as null ciphers, semantic camouflage involves transforming the meaning of a plaintext message rather than by spreading over it parts of a covert message. More specifically, the coding and decoding rules of semantic camouflage are defined using a set of semantic transformations that specify the translation between an overt linguistic unit and its covert meaning (e.g., "bet" is expressed as "play"). Such rules resemble encryption, in that they specify "how to code" rather than "where to hide" (e.g., the null cipher key). But unlike typical cryptographic encryption which transforms the form of a plaintext message, semantic camouflage involves transforming the meaning of a message. Thus, where usual encryption methods will encode two synonym words in completely different ways, semantic camouflage is expected to encode synonyms in the same way (e.g., "play" would be used to encode both "bet" and "gamble").

Producing a good semantically camouflaged message is more subtle than simply transforming a series of individual words. Instead, it amounts to adopting one or more suitable metaphors in which events and situations are meaningfully transposed. Complex metaphors are not readily defined on-the-fly because they generally require agreement in advance. In addition, a metaphor may not always be used consistently because new events may occur that may not be readily described using the agreed upon metaphor. Because of these difficulties, the use of semantic camouflage is often imperfect.

SUMMARY OF INVENTION

In accordance with the invention, there is provided a system, method and article of manufacture therefor, that takes advantage of imperfect use of semantic camouflage to automatically detect and decode its presence in natural language messages. Generally, the system is adapted to identify the relative lack of semantic plausibility that semantic camouflage transformations tend to induce on overt messages. More specifically, the system is adapted to identify entities such as words or phrases in overt messages that are disguised using different and unrelated entities or concepts. In accordance with one aspect of the invention, the system automatically determines the semantic plausibility of the overt message and identifies entities that appear in implausible contexts (i.e., entities unlikely to appear in the context of the overt message). In accordance with another aspect of the invention, the system automatically estimates covert meanings for the entities that are identified as being used in an implausible context.

In accordance with yet another aspect of the invention, there is provided a method, apparatus and article of manufacture therefor, for a method for detecting semantically encoded natural language in textual input data. Initially, the textual input data is segmented into a plurality of token linguistic units to define a linguistic event. Subsequently, one or more token linguistic units in the linguistic event are assigned a context. Each context, which is assigned to a token linguistic unit in the linguistic event, has at least one linguistic relation that relates the token linguistic unit in the linguistic event and at least one other token linguistic unit in the linguistic event. Finally, a score is computed for the one or more token linguistic units in the linguistic event that are assigned a context. The computed scores for the one or more token linguistic units indicate whether the token linguistic units are expected to appear with their assigned context in the linguistic event.

BRIEF DESCRIPTION OF DRAWINGS

These and other aspects of the invention will become apparent from the following description read in conjunction with the accompanying drawings wherein the same reference numerals have been applied to like parts and wherein the notation { . . . } identifies a set, [ . . . ] identifies a sequence, and < . . . > identifies a tuple, and in which.

DETAILED DESCRIPTION

A. Framework for Processing Semantic Camouflage

Figure 1:
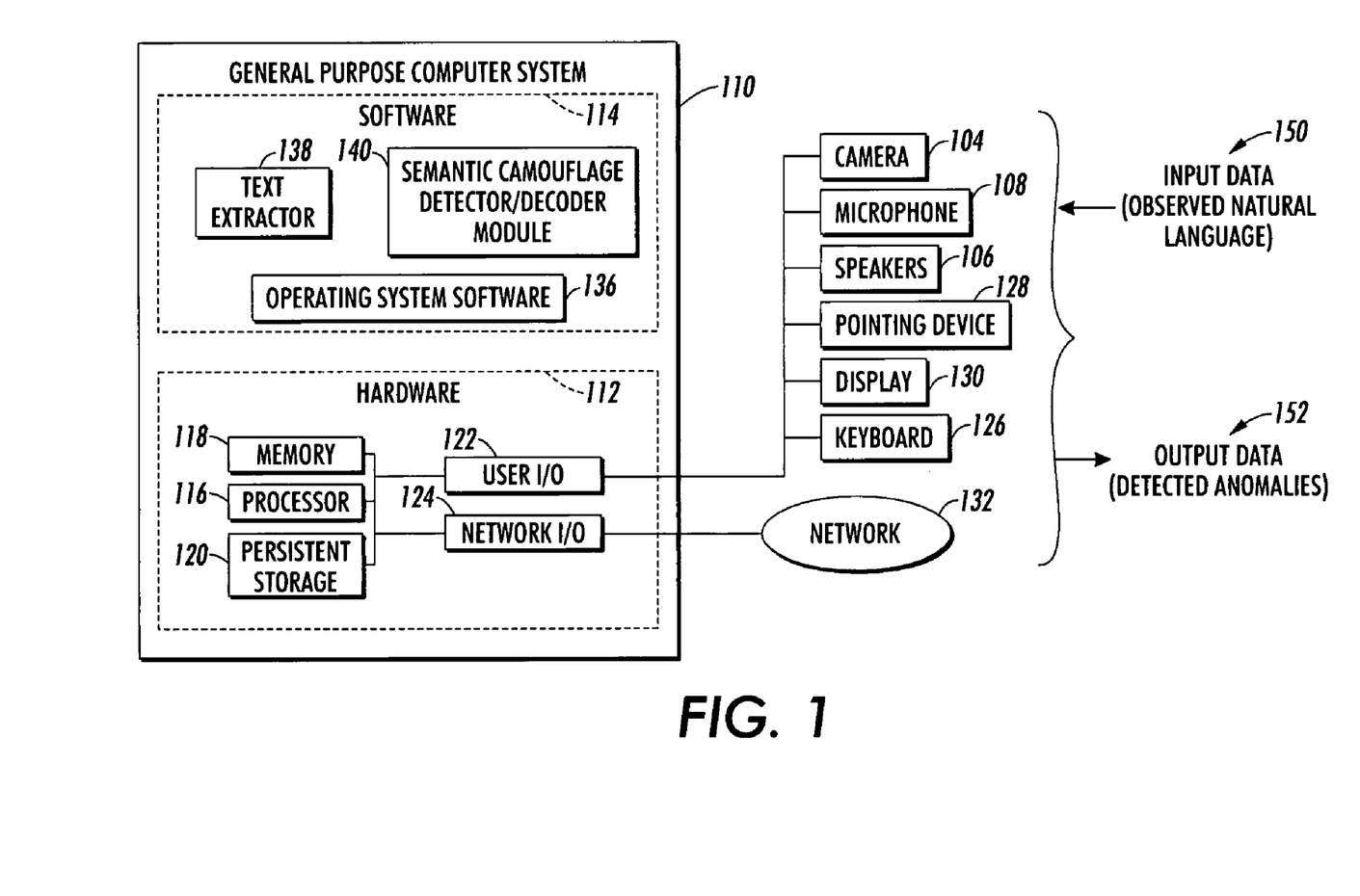
FIG. 1 illustrates a general purpose computer system for carrying out the present invention.
Figure 4:
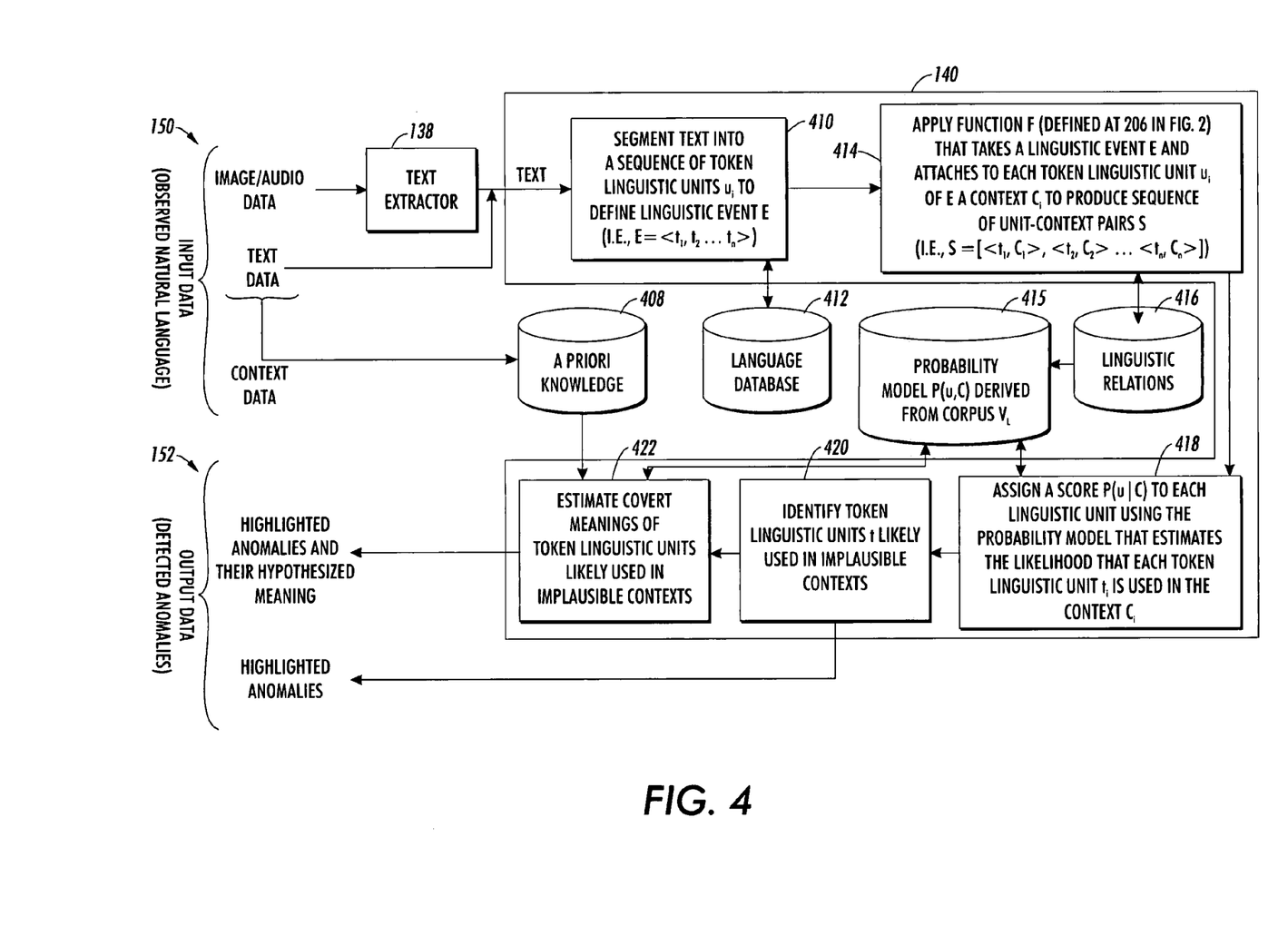
FIG. 4 illustrates details of the semantic camouflage detector and decoder module shown in FIG. 1.

FIG. 1 illustrates a general purpose computer system 110 for carrying out the present invention. The system 110 includes hardware 112 and software 114. The hardware 112 is made up of a processor (i.e., CPU) 116, memory 118 (ROM, RAM, etc.), persistent storage 120 (e.g., CD-ROM, hard drive, floppy drive, tape drive, etc.), user I/O 122, and network I/O 124. The user I/O 122 can include a keyboard 126, a pointing device 128 (e.g., pointing stick, mouse, etc.), microphone 108, camera 104, speakers 106, and the display 130. The network I/O 124 may for example be coupled to a network 132 such as the Internet. The software 114 of the system 110 includes an operating system 136, a text extractor 138 and semantic camouflage detector/decoder module 140. The memory 118 includes a priori knowledge 408, language database 412, probability model P(u,C) 415, and linguistic relations 416 which are shown in FIG. 4 and described in more detail below.

Generally, the system 110 receives input data 150 through I/O 122 or 124 that is reduced to a linguistically analyzable form (e.g., words, phrases, n-grams, etc.). The input data 150 may be in the form of video, audio, textual, and/or image data. The form of the input data 150 may be one that can be input directly to the module 140 or may require pre-processing by text extractor 138. From the input data 150, the system 110 estimates the context in which the input data was used. The system 110 then determines whether the estimated context in which the input data was used is plausible. If the input data is determined to be used in implausible contexts, its covert meaning or context is estimated. The system 110 may thus provide as output data 152, a warning that input data 150 was used in an implausible context along with an estimated context in which the input data 150 was intended to be used.

B. General Framework for Processing Language

The general framework defined herein for processing natural language uses the relevant notion of semantic plausibility of a linguistic event E of natural language L as a function of the similarity between the way token linguistic units (e.g., words, phrases, n-grams, etc.) that make up the linguistic event E are being used in the linguistic event E and in the natural language L as a whole. Specifically, the token linguistic units of plausible events are expected to appear in contexts that are reasonably typical for them. The term linguistic event is defined herein as any coherent linguistic manifestation of natural language L, whether the language is spoken, signed, or written and whether it involves a single party (i.e., a monologue) or several parties (i.e., a dialogue). Tokens are defined herein as instances of such linguistic units occurring in the natural language L.

A linguistic event E can be formally defined as a sequence of token linguistic units E<$t_1, t_2 \ldots t_n$>. Each such token linguistic unit $t_i$ represents an instantiation in the linguistic event of a corresponding linguistic unit in language L defined in a language dictionary of language database 412 and appears in a specific context C that can be formally represented as a set of contextual elements C={$c_1, c_2 \ldots, c_n$} in which each contextual element $c_i$ is a tuple <$r_f, t_1 \ldots t_h$> made up of a linguistic relation $r_f$ that holds between token linguistic unit $t_i$ and the other token linguistic units $t_1 \ldots t_h$, where $t_i \neq t_1 \ldots t_h$ of the same event. The linguistic relation $r_f$ is drawn from a set of $R=\{r_1, r_2 \ldots r_k\}$ of linguistic relations (for example, as stored in memory at 416 in FIG. 4).

Generally, token linguistic units t in a linguistic event E may include any kind and/or combination of linguistic units, and the relations may include any kind of linguistic relation. In one embodiment, relations r in the set of linguistic relations R stored in memory 416 includes one or more of a combination of (a) co-occurrence relations (e.g., linguistic unit A co-occurs with linguistic unit B within a window of N linguistic units), (b) morphological relations (e.g., linguistic unit A and linguistic unit B are related to root C), (c) syntactic relations (e.g., linguistic unit A, which is a noun, is the subject of linguistic unit B, which is a verb), (d) semantic relations (e.g., linguistic unit A is the agent of linguistic unit B), and (e) discourse relations (i.e., cross-sentence relations that include co-reference relations and temporal sequences between actions; e.g., cross-sentence relation between linguistic unit A which is a pronoun and linguistic unit B, which is an antecedent).

It will be appreciated by those skilled in the art that many other linguistic relations not described herein may form part of the set of linguistic relations R stored in memory 416. Any such linguistic relation generally describes how token linguistic units in a linguistic event relate to other token linguistic units in the linguistic event. For example, semantic relations may identify relationships in the universe of interpretation between the entities denoted by the linguistic units of a linguistic event (for example, being the agent or the recipient of some action, such as the perpetrator and the victim, respectively, of a crime). It will further be appreciated that such semantic relations are often coupled with syntactic relations (for example, the syntactic subject of the English verb "hit" is associated with an agent role and its syntactic object with a victim role). Some important factors that are identified for evaluating the relation of two token linguistic units include: the order in which token linguistic units are used in a linguistic event; and the repetition of the same token linguistic unit throughout a linguistic event.

For example, in a semantically transformed message that uses the concept "bedtime story" to camouflage the concept "bomb", the context of the token linguistic unit "bedtime story" is found to include the following relations in the linguistic event (additional background of such a semantically transformed message is described in the publication entitled "Language and National Security, Language in Intelligence", published by the National Foreign Language Center at the University of Maryland on the Internet at http://www.nflc.org/security/lang_terror.htm): (a) it co-occurs with the linguistic units: prepare, oil, fertilizer, warehouse; (b) it is the syntactic object of the linguistic unit: prepare; and (c) it is the complement of: warehouse. In this example, the linguistic units are words and the linguistic relations between the linguistic units are co-occurrence or syntactic dependencies of some kind. By evaluating how likely the token linguistic unit "bedtime story" is used with such relations in its assigned contexts within the message, the invention takes advantage of imperfect use of semantic camouflage to automatically detect implausible uses in the linguistic event of token linguistic units in their assigned contexts.

Figure 2:
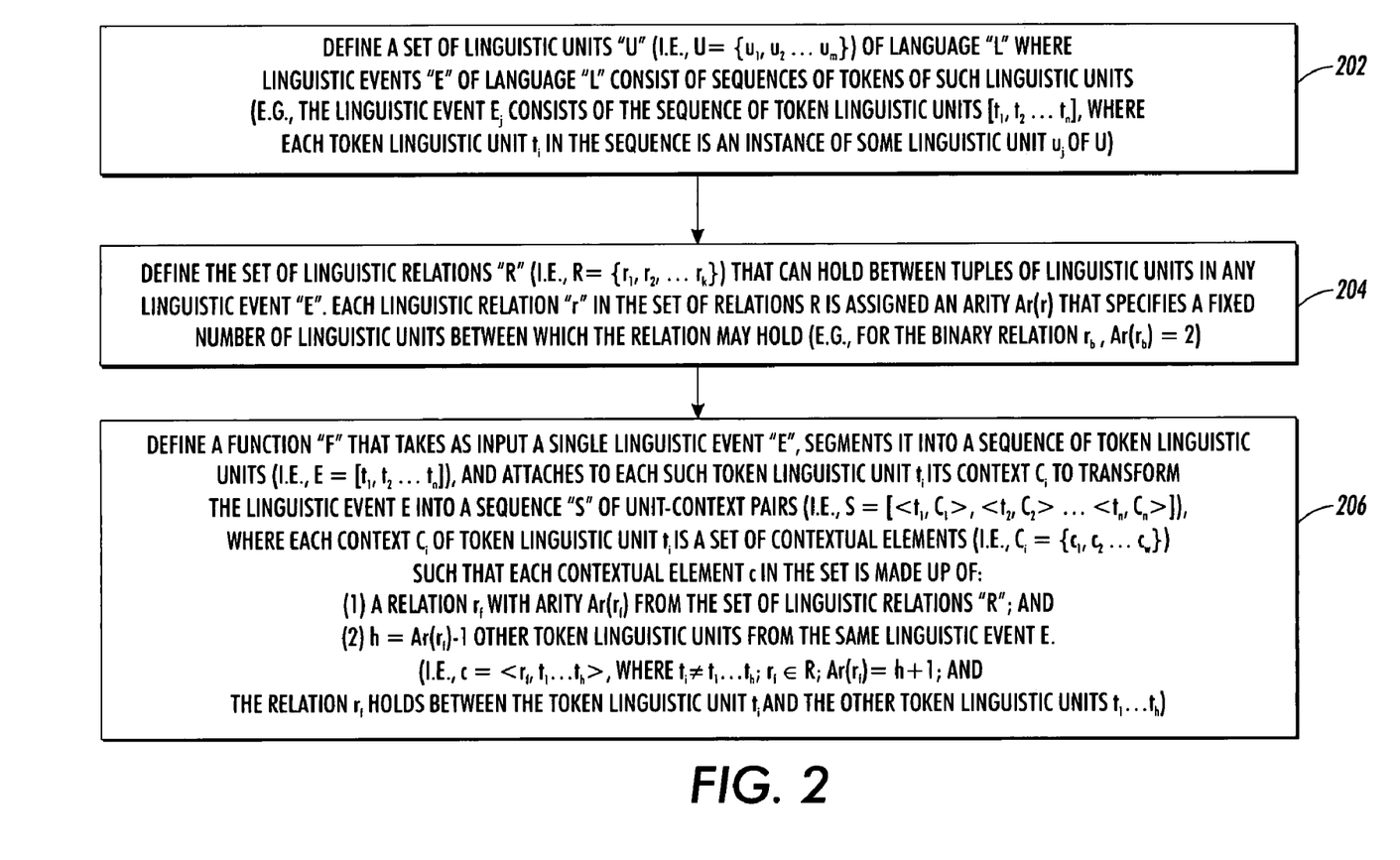
FIG. 2 sets forth a flow diagram for defining a general framework for processing a language "L"

FIG. 2 sets forth a flow diagram for defining a general framework for processing events of a language "L" that may originate from, for example, input data 150 or an assembled corpus. The corpus may for example be the British National Corpus (BNC), which is a collection of samples of written and spoken language designed to represent a wide cross-section of current written and spoken English.

Initially at 202, a set of linguistic units "U" (i.e., $U=\{u_1, u_2 \ldots u_m\}$) of natural language "L" is defined. These linguistic units may, for example, be words, n-grams, or phrases. The natural language L is made up of linguistic events "E". Each linguistic event E consists of a sequence of tokens of linguistic units from the set of linguistic units U. For example, the linguistic event $E_j$ may consist of the sequence of token linguistic units $[t_1, t_2 \ldots t_n]$, where each token linguistic unit $t_i$ in the sequence is an instance of some linguistic unit $u_j$ of U.

At 204, a set of linguistic relations "R" (i.e., $R=\{r_1, r_2 \ldots r_k\}$) (stored at 416 in FIG. 4) that can hold between tuples of linguistic units in any linguistic event E is defined. Each linguistic relation "r" in the set of linguistic relations R is assigned an arity Ar(r), which specifies a fixed number of linguistic units between which the linguistic relation may hold (i.e., generally "arity" is the number of arguments a function or operator takes). For example, a binary linguistic relation $r_b$ has an arity $Ar(r_b)$ equal to two.

At 206, a function "F" is defined. The function F takes as input a single linguistic event E and segments it into a sequence of token linguistic units (i.e., $E=[t_1, t_2 \ldots t_n]$). Further, the function F attaches to each token linguistic unit $t_i$ in the sequence of linguistic units a context $C_i$, thereby transforming the linguistic event E into a sequence "S" of unit-context pairs (i.e., $S=[<t_1, C_1>, <t_2, C_2> \ldots <t_n, C_n>]$). Each context $C_i$ of token linguistic unit $t_i$ is a set of contextual elements (i.e., $C_i=\{c_1, c_2 \ldots c_w\}$). Each contextual element $c_m$ in the set of contextual elements is made up of: (1) a linguistic relation $r_f$ from the set of linguistic relations R; and (2) $h=Ar(r_f)-1$ other token linguistic units from the same linguistic event E. In other words, each contextual element $c=<r_f, t_1 \ldots t_h>$ in the set of contextual elements $C_i$ is provided such that: $t_i \neq t_1 \ldots t_h$; $r_f \in R$; and the relation $r_f$ holds between the token linguistic unit $t_i$ and the token linguistic units $t_1 \ldots t_h$.

To recapitulate, for each different natural language L processed by the system 110, there is defined at 202, 204, and 206:

$U=\{u_1, u_2 \ldots u_m\}$, a set of linguistic units of natural language L;

$E=[t_1, t_2 \ldots t_n]$, a linguistic event E made up of a sequence of token linguistic units, with each token linguistic unit identifying an instance of such linguistic unit occurring in the natural language L;

$R=\{r_1, r_2 \ldots r_k\}$, a set of linguistic relations that can hold between token linguistic units in the linguistic event E, and where each relation in the set of linguistic relations is typed for its arity; and F, a function that reduces the linguistic event E of natural language L to:

$S=[<t_1, C_1>, <t_2, C_2> \ldots <t_n, C_n>]$, a sequence of unit-context pairs, where $C_i$ is a context of token linguistic unit $t_i$ that is made up of a set of contextual elements $\{c_1, c_2 \ldots c_w\}$, and where $c=<r_f, t_1 \ldots t_h>$ provides that each contextual element c in the set of contextual elements is made up of a relation $r_f$ from the set of linguistic relations and $h=Ar(r_f)-1$ other token linguistic units from the same linguistic event E.

Figure 3:
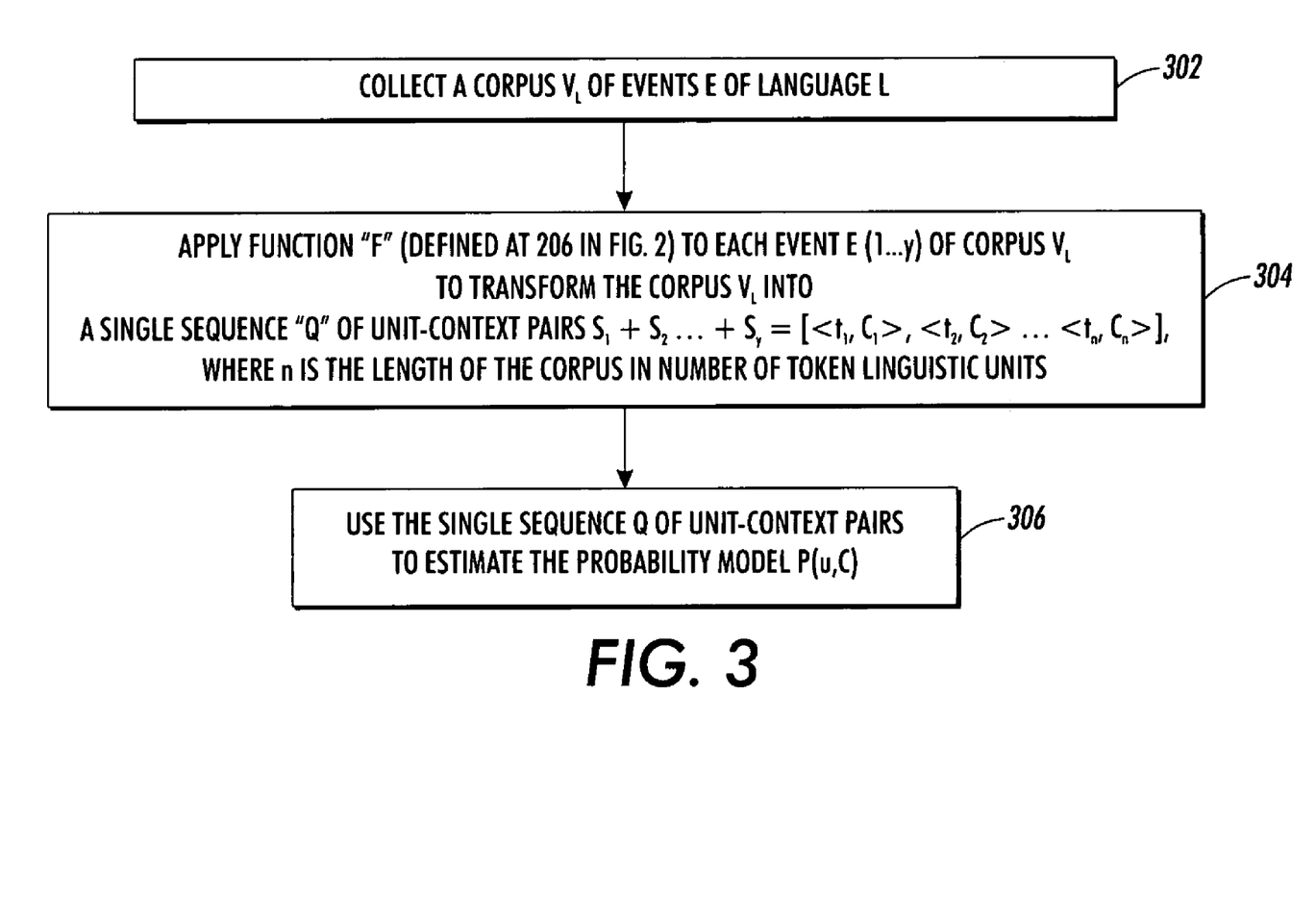
FIG. 3 sets forth a flow diagram for estimating parameters of a probability model P(u,C)

Given this general framework, a probability model P(u,C) can be defined on contexts C for linguistic units u in the set of linguistic units U. FIG. 3 sets forth a flow diagram for estimating parameters of the probability model P(u,C). The probability model is one embodiment for estimating the likelihood that a linguistic unit u occurs in the context C. In alternate embodiments, this likelihood can be estimated using approximation techniques that define weights that are not based on sound probability models where decisions are made on the basis of intuitions instead of statistics. In a sound probability model, the probability of all choices should sum to one at each choice point, which need not be the case in such approximation techniques.

Estimating the parameters of the probability model P(u,C) may be briefly summarized as follows. Initially, a large number of linguistic events of natural language L are collected. The function F, described above, is applied to the corpus $V_L$ so as to extract from it tokens of linguistic units $t_i$, each one with its respective context $C_i$. For each linguistic unit u appearing in $V_L$, a probability model P(u,C) may be estimated by considering all token linguistic units t of u in $V_L$ and performing statistical counts on the contexts associated with these token linguistic units.

Depending on the details of the probability model, some simplifying assumptions may be required in order to perform its estimation. For example, with some probability models it might be useful to assume that the elements of a context C={$c_1,c_2 \ldots ,c_n$} are statistically independent, even though this may not be true in practice. Moreover, some probability smoothing may be required so as to render the probability model robust in the face of events that may not have been observed in the corpus.

With reference again to FIG. 3, the details for estimating the probability model P(u,C) are described. At 302, a corpus $V_L$ of events E of natural language L is collected. It will be appreciated by those skilled in the art that collecting the corpus $V_L$ may be fully automated so that it may be applied to process very large amounts of linguistic data, and thereby record in the corpus a large quantity of plausible linguistic events.

At 304, the function F defined at 206 in FIG. 2 is applied to each event E (1 . . . y) of corpus $V_L$ to transform the corpus $V_L$ into a single sequence "Q" of unit-context pairs: $S_1$+$S_2$ . . . +$S_y$=[<$t_1, C_1$>, <$t_2, C_2$> . . . <$t_n, C_n$>], where n is the length of the corpus in number of linguistic units.

At 306, the single sequence Q of unit-context pairs is used to estimate the probability model P(u,C).

In a first method for estimating a probability model at 306, a corpus is collected at 302, which has a sufficient number of samples of data to accurately account for the interaction of interdependent contextual elements "c" in events E of the natural language L. Such a corpus is used at 306 to estimate the probability model P(u,C). In an embodiment with a corpus comprising N linguistic units, the data over which the probabilities are estimated is a set of unit-context pairs (i.e., {$u^i,C^i$}, where i=1 . . . N). The probability model P(u,C) for the corpus may then be estimated using the maximum likelihood estimate given by:

$$\hat{P}(u, C) = \frac{\#\{i \mid t^i = u, C^i = C\}}{N},$$

where:
"#" is the number of elements contained in (or cardinality of) the set { } to which # is attached,
"u" belongs to U={$u_1, u_2 \ldots u_m$}, the set of linguistic units of natural language L,
"$t^i$" is the $i^{th}$ token linguistic unit appearing in the corpus $V_L$ that comprises a total of N token linguistics units,
"$C^i$" is the context associated with the linguistic unit $u^i$, and made up of interdependent contextual elements "c", and where P(u) and P(C) may be computed by marginalizing P(u,C) using, respectively:

$$P(u) = \sum_C P(u, C) \text{ and } P(C) = \sum_u P(u, C),$$

and further where P(u|C) may be computed using the relation:

$$P(u \mid C) = \frac{P(u, C)}{P(C)}.$$

In second method for estimating a probability model at 306, a corpus is collected at 302 that requires less sample data. Such a corpus is used at 306 to approximate probabilities for the probability model P(u,C) using the Naïve Bayes independence assumption between the elements cj of context C using the following equations and relations (where $t^i$ is the $i^{th}$ token linguistic unit appearing in the corpus $V_L$ that comprises a total of N token linguistic units):

$$P(C \mid u) \alpha \prod_{c_j \in C} P(c_j \mid u),$$

$$P(u) = \frac{\#\{i \mid t^i = u\}}{N},$$

$$P(C) = \sum_u P(C \mid u) P(u), \text{ and}$$

$$P(u \mid C) = \frac{P(C \mid u) P(u)}{P(C)}.$$

Upon developing a probability model P(u,C) at 306 using either method, the probability model P(u,C) for the corpus $V_L$ is stored in memory 118 of the system 110 shown in FIG. 1 for use by the semantic camouflage detector and decoder module 140, as shown in more detail at 415 in FIG. 4.

C. Exemplary Embodiments for Processing Language

FIG. 4 illustrates details of the semantic camouflage detector and decoder module 140 shown in FIG. 1. Input data (or observed natural language data) 150 may, for example, take the form of text data or image/audio data. In the case of text data, the input data is input directly to the detector and decoder module 140. In the case of image/audio data the text extractor 138 extracts text from image and/or audio data through means known in the art. The textual output of the text extractor 138 is input directly to the module 140.

Upon receipt of input data 150 in the form of text (i.e., whether or not pre-processed by text extractor 138), a segmentation module 410 segments the text input into a sequence of token linguistic units $t_i$ using language database 412 to define a linguistic event E (i.e., E=<$t_1, t_2 \ldots t_n$>). In one embodiment, the text segmentation module 410 tokenizes the text input at word boundaries and/or phrase (i.e., multiword) boundaries. The language database 412 includes linguistic units of one or more language dictionaries that are used to perform text segmentation. The language dictionary from the language database 412 that is used to process the input text may for example be chosen using a language guesser or identified in advance.

A context computation module 414 applies the function F, as defined at 206 in FIG. 2, that takes the linguistic event E defined by module 410 and attaches to each (or, alternatively, one or more) token linguistic unit $t_i$ of the linguistic event E a context $C_i$ to produce a sequence of unit-context pairs S (i.e., S=[<$u_1$, $C_1$>, <$u_2$, $C_2$> . . . <$u_n$, $C_n$>]). As set forth above, each context $C_i$ of each token linguistic unit $t_i$ in the sequence of unit-context pairs S is a set of contextual elements such that each contextual element c in the set of contextual elements C is made up of a relation r from the set of linguistic relations 416 and at least one other token linguistic unit u from the linguistic event E.

A score computation module 418 assigns a score (e.g., P(u|C)) to each token linguistic unit $t_i$ for its context $C_i$ in the sequence of unit-context pairs S of the linguistic event E using the probability model P(u,C) derived from corpus $V_L$ stored at 415 and produced as described above with reference to FIG. 3. The score provides an estimate of the plausibility that the token linguistic unit $t_i$ should appear in its context $C_i$ in the linguistic event E.

A context verification module 420 determines whether token linguistic units $t_i$ for the linguistic event E have likely been used in an implausible context (or alternatively in a plausible context). The determination that the linguistic event E defined at 410 is likely used in an implausible context is output as warning (or output) data 152. In one embodiment, the warning data is provided with anomalies highlighted in the input data (i.e., linguistic units that are identified as being used in implausible contexts). In another embodiment, the warning data is a signal that indicates anomalies have been identified in the input data but does not identify the anomalies.

As computed at 418, the plausibility of the linguistic event E, which is made up of token linguistic units <$t_1, t_2 \ldots, t_n$> that have assigned contexts <$C_1, C_2 \ldots, C_n$>, depends on the value of P(u|$C_i$) for its token linguistic units $t_i$. It will be appreciated by those skilled in the art that there exists various ways to define, at 420, the plausibility of the linguistic event E on the basis of the plausibility of its individual components P(u|C).

In one embodiment, the plausibility of the linguistic event E is equated with the lowest scoring value of P(u|$C_i$) in the linguistic event E, thus drawing attention to linguistic units that are being used in the most implausible way. However, because a judgment based on a single value P(u|$C_i$) is inherently less robust to noise in the input data, various filters may need to be added, such as for example a filter to disregard rare linguistic units because the probability estimates associated with them may be unreliable. In addition as part of this embodiment or forming part of a separate embodiment, a plausibility threshold may be determined (e.g., empirically) below which low scoring linguistic units or low scoring linguistic events may be flagged as potentially being camouflage.

Generally, camouflage detection at 420 identifies a low plausibility value for token linguistic units in the overt message (i.e., input data), which in turn relies upon some token linguistic units $t_i$ of that overt message appearing in unlikely contexts $C_i$, that is, with particularly low values for P(u|$C_i$). Such low values raise the suspicion that the presence of the token linguistic unit $t_i$ is actually the result of applying a camouflage recoding rule, such as: all tokens of some unknown (camouflaged) linguistic unit $u_j$ are recoded as tokens of linguistic unit $u_i$. In one embodiment at 420, all values of p(u|$C_i$) that fall below the predetermined plausibility threshold are assumed to be a side effect of some camouflage recoding rule and will be flagged as such.

In addition, a covert meaning estimation module 422 may form part of (or alternatively be operationally separate from) the decoder/detector module 140 to estimate covert meanings of token linguistic units t identified as having been used in implausible contexts (and/or highlighted as anomalies in the input data). If $t_i$ is a token of linguistic unit $u_i$ and $t_i$ appears in context $C_i$ and the value of P($u_i|C_i$) is such that it is found likely that the tokens of some unknown linguistic $u_j$ are being camouflaged as tokens of $u_i$, then one or more possible values for $u_j$ may be estimated by selecting one or more linguistic units u for which the value P(u|$C_i$) is maximal (or more probable).

The covert meaning estimation module 422 thus enables the reconstruction of one or more hypothesized camouflage recoding rules in, for example, the form where token linguistic unit $u_j$ is assigned to linguistic unit $u_i$. In reconstructing the hypothesized camouflage recoding rules, a list of one or more values for each hypothesized covert token linguistic unit may be provided as output data 152 (possibly including a value indicating their likely probability in the context).

Those skilled in the art will appreciate that the method described above for estimating hypothesized meanings for a camouflage recoding rule assumes that the context $C_i$ was not distorted by additional camouflage recoding rules. When such distortions occur, the module 140 is required to take these additional dependencies into account.

In another embodiment of the semantic camouflage detector/decoder module 140, a priori knowledge stored at 408 is used to help determine what is likely or unlikely to be recoded. Without using a priori knowledge 408, all linguistic units u of language L are taken to be equally likely to appear in the input or output of camouflage recoding rules.

In this alternate embodiment that uses a priori knowledge 408, the detector/decoder module 140 may be customized/optimized for specific classes of covert messages (e.g., for a class of messages concerning drug transactions). That is, the detector/decoder module 140 in this alternate embodiment is adapted to increase its relative performance through the addition of some amount of domain-specific a priori knowledge. For example, the input data may include in addition to text data, context data that is associated with the text and/or image/audio data received at 150. Such context data may be received and/or produced using one or a combination of the input data 150 (e.g., evaluate an image to identify objects and/or locations) and data from one or more additional input sources (e.g., a third party data source identifying location where input data is produced), and thereafter stored in memory 408 that records a priori knowledge for input data 150.

The context data stored in memory 408 may be advantageously used in an alternate embodiment to limit the range of potential camouflage recoding rules to those that happen to recode some particular sets of linguistic units. For example, if to the camouflage detector/decoder module 140 is intended to operate primarily with camouflaged drug transactions, linguistic units such as like "drug" are more likely to be recoded than linguistic units such as "flower". The linguistic unit "drug" may thus be declared part of a "sensitive" subset of linguistic units $U_{LS} \subseteq U_L$ that will be considered as candidates for camouflage. Potential sets of camouflage recoding rules may then be partial functions such as: subset of linguistic units $U_{LS}$ is assigned to subset of linguistic units $U_L$-$U_{LS}$.

Restricting the domain of potential camouflage rules to a sensitive subset of linguistic units $U_{LS}$ has a potential beneficial impact on both the detection and decoding performed by the module 140 at 420 and 422, respectively. At the detection stage, generally linguistic unit $u_j$ that appears in low-plausibility contexts $C_i$ is identified because this may indicate that linguistic unit $u_j$ is a camouflage for some other linguistic unit. But this entails that the only contexts in which interest is sought are those contexts that constitute good contexts for one or more of the linguistic units in the sensitive subset of linguistic units $U_{LS}$. Suppose for example that the score $p(u_i|C_i)$ falls below some predetermined threshold that makes it a candidate for camouflage. Then, the module 140 may at 420 verify that there exists some $u_j \epsilon U_{LS}$ such that $p(u_j|C_i)$ has a high value. If not the low value of $p(u_i|C_i)$ may be regarded by the module 140 at 420 as noise in the data. As a result, the precision of detecting linguistic units likely used in implausible contexts at 420 may be increased. Similarly, when estimating covert meanings at 422, considering possibilities that are only within the sensitive subset of linguistic units $U_{LS}$ may also increase decoding precision.

D. Miscellaneous

Using the foregoing specification, the invention may be implemented as a machine (or system), process (or method), or article of manufacture by using standard programming and/or engineering techniques to produce programming software, firmware, hardware, or any combination thereof. It will be appreciated by those skilled in the art that the flow diagrams described in the specification are meant to provide an understanding of different possible embodiments of the invention. As such, alternative ordering of the steps, performing one or more steps in parallel, and/or performing additional or fewer steps may be done in alternative embodiments of the invention.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the invention.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A method for detecting semantically encoded natural language in textual input data, comprising:

segmenting the textual input data into a plurality of token linguistic units to define a linguistic event;

assigning a context to one or more of the token linguistic units in the linguistic event;

computing a score for the one or more token linguistic units in the linguistic event that are assigned a context;

applying a predetermined threshold to the score of the one or more token linguistic units to determine whether their use in the linguistic event in their assigned contexts is implausible;

estimating covert meanings of token linguistic units identified as being below the predetermined threshold; and detecting semantically encoded natural language based on replacing all occurrences, within the linguistic event, of the token linguistic units identified as being below the predetermined threshold with the estimated covert meaning of the token linguistic units identified as being below the predetermined threshold;

wherein the computed scores for the one or more token linguistic units indicate whether the token linguistic units are expected to appear with their assigned contexts in the linguistic event; and wherein each context, which is assigned to a token linguistic unit in the linguistic event, has at least one linguistic relation that relates the token linguistic unit in the linguistic event and at least one other token linguistic unit in the linguistic event.

2. The method according to claim 1, further comprising using a priori knowledge concerning the textual input data to estimate the covert meanings of token linguistic units identified as being below the predetermined threshold.

3. The method according to claim 1, further comprising estimating a covert meaning of a token linguistic unit when its computed score indicates that its use in the linguistic event in its assigned contexts is implausible.

4. The method according to claim 3, wherein the token linguistic units are one of words, phrases, and n-grams.

5. The method according to claim 1, further comprising estimating a probability model P(u,C) based on contexts C for a set of linguistic units U, where U is given by $\{u_1, u_2 \ldots u_m\}$, occurring in a corpus $V_L$ of natural language L; wherein the scores for linguistic units in the linguistic event are assigned using the probability model P(u,C).

6. The method according to claim 5, further comprising collecting the corpus $V_L$, of events E of the natural language L, wherein the corpus $V_L$ includes a set of linguistic units U of the natural language L, and wherein tuples of linguistic units in the set of linguistic units U have one or more relations defined therebetween that are selected from a set of linguistic relations R, where R is given by $\{r_1, r_2 \ldots r_k\}$.

7. The method according to claim 6, wherein relations in the set of linguistic relations are one or more of a combination of (a) co-occurrence relations, (b) morphological relations, (c) syntactic relations, (d) semantic relations, and (e) discourse relations.

8. The method according to claim 7, further comprising reducing linguistic events in the natural language L to a sequence of unit-context pairs S, where S is given by [<$u_1$, $C_1$>, <$u_2$, $C_2$> . . . <$u_n$, $C_n$>], where $C_i$ is a context of linguistic unit u, that is made up of a set of contextual elements $\{c_1, c_2 \ldots c_w\}$, and where $c=<r_f, t_1 \ldots t_h>$ provides that each contextual element c in the set of contextual elements $C_i$ is made up of a relation $r_f$ from the set of linguistic relations and $h=Ar(r_f)-1$ other token linguistic units from the same linguistic event E.

9. The method according to claim 1, further comprising converting audio or image input data with textual content to the textual input data.

10. An apparatus for detecting semantically encoded natural language in textual input data, comprising:
- a segmentation module for segmenting the textual input data into a plurality of token linguistic units to define a linguistic event;
- a context computation module for assigning a context to one or more of the token linguistic units in the linguistic event;
- a score computation module for computing a score for the one or more token linguistic units in the linguistic event that are assigned a context;
- a context verification module for applying a predetermined threshold to the score of the one or more token linguistic units to determine whether their use in the linguistic event in their assigned contexts is implausible; and
- a covert meaning estimation module for estimating covert meanings of token linguistic units identified as being below the predetermined threshold and the covert meaning estimation module detecting semantically encoded natural language based on replacing all occurrences, within the linguistic event, of the token linguistic units identified as being below the predetermined threshold with the estimated covert meaning of the token linguistic units identified as being below the predetermined threshold;
- wherein the computed scores for the one or more token linguistic units indicate whether the token linguistic units are expected to appear with their assigned contexts in the linguistic event; and
- wherein each context, which is assigned to a token linguistic unit in the linguistic event by the context computation module, has at least one linguistic relation that relates the token linguistic unit in the linguistic event and at least one other token linguistic unit in the linguistic event.

11. The apparatus according to claim 10, further comprising memory for storing a priori knowledge concerning the textual input data for estimating the covert meanings of token linguistic units identified as being below the predetermined threshold.

12. The apparatus according to claim 10, further comprising:
- means for estimating a probability model P(u,C) based on contexts C for a set of linguistic units U, where U is given by $\{u_1, u_2 \ldots u_m\}$, occurring in a corpus $V_L$ of natural language L; and
- memory for storing an estimated probability model P(u, C);
- wherein the scores for linguistic units in the linguistic event are assigned using the probability model P(u,C).

13. The apparatus according to claim 12, further comprising means for collecting the corpus $V_L$ of events E of the natural language L, wherein the corpus $V_L$ includes a set of linguistic units U of the natural language L, and wherein tuples of linguistic units in the set of linguistic units U have one or more relations defined therebetween that are selected from a set of linguistic relations R, where R is given by $\{r_1, r_2 \ldots r_k\}$.

14. The apparatus according to claim 13, wherein relations in the set of linguistic relations are one or more of a combination of (a) co-occurrence relations, (b) morphological relations, (c) syntactic relations, (d) semantic relations, and (e) discourse relations.

15. The apparatus according to claim 14, further comprising reducing linguistic events in the natural language L to a sequence of unit-context pairs S, where S is given by $[<u_i, C_1>, <u_2, C_2> \ldots <u_n, C_n>]$, where $C_i$ is a context of linguistic unit u, that is made up of a set of contextual elements $\{c_1, c_2 \ldots c_w\}$, and where $c=<r_f, t_1 \ldots t_h>$ provides that each contextual element c in the set of contextual elements $C_i$ is made up of a relation $r_f$ from the set of linguistic relations and $h=Ar(r_f)-1$ other token linguistic units from the same linguistic event E.

16. A memory device for storing a set of program instructions executable on a data processing device and usable for detecting semantically encoded natural language in textual input data, the set of program instructions comprising instructions for:
- segmenting the textual input data into a plurality of token linguistic units to define a linguistic event;
- assigning a context to one or more of the token linguistic units in the linguistic event;
- computing a score for the one or more token linguistic units in the linguistic event that are assigned a context;
- applying a predetermined threshold to the score of the one or more token linguistic units to determine whether their use in the linguistic event in their assigned contexts is implausible;
- estimating covert meanings of token linguistic units identified as being below the predetermined threshold; and
- detecting semantically encoded natural language based on replacing all occurrences, within the linguistic event, of the token linguistic units identified as being below the predetermined threshold with the estimated covert meaning of the token linguistic units identified as being below the predetermined threshold;
- wherein the computed scores for the one or more token linguistic units indicate whether the token linguistic units are expected to appear with their assigned contexts in the linguistic event; and
- wherein each context, which is assigned to a token linguistic unit in the linguistic event, has at least one linguistic relation that relates the token linguistic unit in the linguistic event and at least one other token linguistic unit in the linguistic event.

* * * * *